(12) United States Patent
Kobayashi

(10) Patent No.: US 6,859,329 B2
(45) Date of Patent: Feb. 22, 2005

(54) SCANNING TYPE DISPLAY OPTICAL SYSTEM AND SCANNING TYPE IMAGE DISPLAY APPARATUS

(75) Inventor: Shuichi Kobayashi, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 10/636,882

(22) Filed: Aug. 7, 2003

(65) Prior Publication Data

US 2004/0027641 A1 Feb. 12, 2004

(30) Foreign Application Priority Data

Aug. 9, 2002 (JP) ........................................ 2002-233915

(51) Int. Cl.⁷ .................... G02B 26/08; G02B 27/14; G02B 3/00; G02B 13/18
(52) U.S. Cl. .................... 359/635; 359/662; 359/718; 359/205; 359/206; 359/216; 359/217
(58) Field of Search .................... 359/635, 631, 359/627, 640, 662, 718, 205, 206, 216, 217

(56) References Cited

U.S. PATENT DOCUMENTS

| | | | |
|---|---|---|---|
| 3,995,944 A | 12/1976 | Queeney | 8/636 |
| 5,025,268 A | * 6/1991 | Arimoto et al. | 347/259 |
| 5,710,654 A | * 1/1998 | Ota | 359/205 |
| 6,282,008 B1 | 8/2001 | Togino | 359/196 |

FOREIGN PATENT DOCUMENTS

| | | |
|---|---|---|
| EP | 1225 470 A2 | 7/2002 |
| JP | 2001-281583 | 10/2001 |

OTHER PUBLICATIONS

JPO Patent Abstract and English Translation of JP 2000–180759.
JPO Patent Abstract and English Translation of JP 2000–281583.
Kogaku Gijutsu Contact vol. 21, No. 6–7 (w/o English translation).

* cited by examiner

Primary Examiner—Tim Thompson
(74) Attorney, Agent, or Firm—Morgan & Finnegan, LLP

(57) ABSTRACT

A scanning type display optical system which is small in size and can display images by two-dimensionally scanning light is disclosed. The scanning type display optical system scans light from a light source in a first direction by a first scanning device, and scans light from the first scanning device in a second direction by a second scanning device. Between the first scanning device and the second scanning device, a light guide optical system which includes at least one rotationally asymmetric reflective surface to guide light from the first scanning device to the second scanning device is provided.

6 Claims, 13 Drawing Sheets

SCANNING TYPE DISPLAY OPTICAL SYSTEM AND SCANNING TYPE IMAGE DISPLAY APPARATUS

BACKGROUND OF THE INVENTION

1. Field of the Invention

The present invention relates to a scanning type display optical system and a scanning type image display apparatus, which display images by scanning light.

2. Description of Related Art

Generally, scanning type image display apparatuses are characterized by having high resolution, and various structures have been proposed.

For example, a laser display is reported in "Kogaku Gijutsu Contact (meaning Optical Technology Contact) Vol. 21, No. 6–7" (1983). This obtains high-quality TV pictures by modulating laser beams with an optical modulator and two-dimensionally scanning the modulated beams with a polygon mirror and a galvano-mirror at a high speed. Furthermore, a similar art is proposed in Japanese Patent Application Laid-Open No. 2000-180759.

These image display apparatuses realize high-speed horizontal scanning by using a polyhedral mirror (polygon mirror). Concretely, in order to make the horizontal scanning rate high, a polygon mirror having eight or more reflective surfaces is used.

On the other hand, recently, a device called Micro Electro Mechanical System (hereinafter, referred to as MEMS) using semiconductor production technology has been developed.

Machinery produced by using MEMS technology is very small in size and light in weight, and has very quick response, and application of this system to various fields is being considered. Particularly, development in the field called MOEMS (Micro Optical Electro Mechanical System) obtained by applying MEMS to optics is active, and scanning devices using MEMS technology have been developed.

A technique relating to an image display apparatus using a scanning device using such MEMS technology has been proposed in Japanese Patent Application Laid-Open No. 2001-281583. In this Laid-Open 2001-281583, a scanning optical system has been proposed which two-dimensionally scans a projection surface by two-dimensionally deflecting light emitted from a light source with a scanning device, wherein a small-sized scanning optical system is realized by the scanning device and an optical system including a rotationally asymmetric surface prepared by MEMS technology.

In the abovementioned laser display reported in "Kogaku Gijutsu Contact (meaning Optical Technology Contact) Vol. 21, No. 6–7 (1983)" or in the scanning optical system proposed in Japanese Patent Application Laid-Open No. 2000-180759, a polygon mirror having eight reflective surfaces is used as the scanning device. This easily results in an increase in size of the scanning device since the number of reflective surfaces is large in one optical device although high-speed scanning is possible.

Furthermore, in Japanese Patent Application Laid-Open No. 2001-281583, a scanning device shown in FIG. 3 of this publications is used. Namely, a scanning device which scans light by oscillating the reflective surface biaxially is used. However, since biaxial scanning is carried out by one reflective surface, the structure of the scanning device becomes complicated or the device increases in size.

SUMMARY OF THE INVENTION

An object of the invention is to provide a scanning type display optical system which is small in size and enables image display by two-dimensionally scanning light, and a scanning type image display apparatus using the same.

A scanning type display optical system of the invention scans light from a light source in a first direction by a first scanning device, and scans light from the first scanning device in a second direction by a second scanning device. A light guiding optical system including at least one rotationally asymmetric reflective surface, which guides the light from the first scanning device to the second scanning device, is provided between the first scanning device and the second scanning device.

The characteristics of the scanning type display optical system and the scanning type image display apparatus of the present invention will be made clear by a description of the specific embodiments below with reference to the attached drawings.

DETAILED DESCRIPTION OF THE PREFERRED EMBODIMENTS

Figure 1:
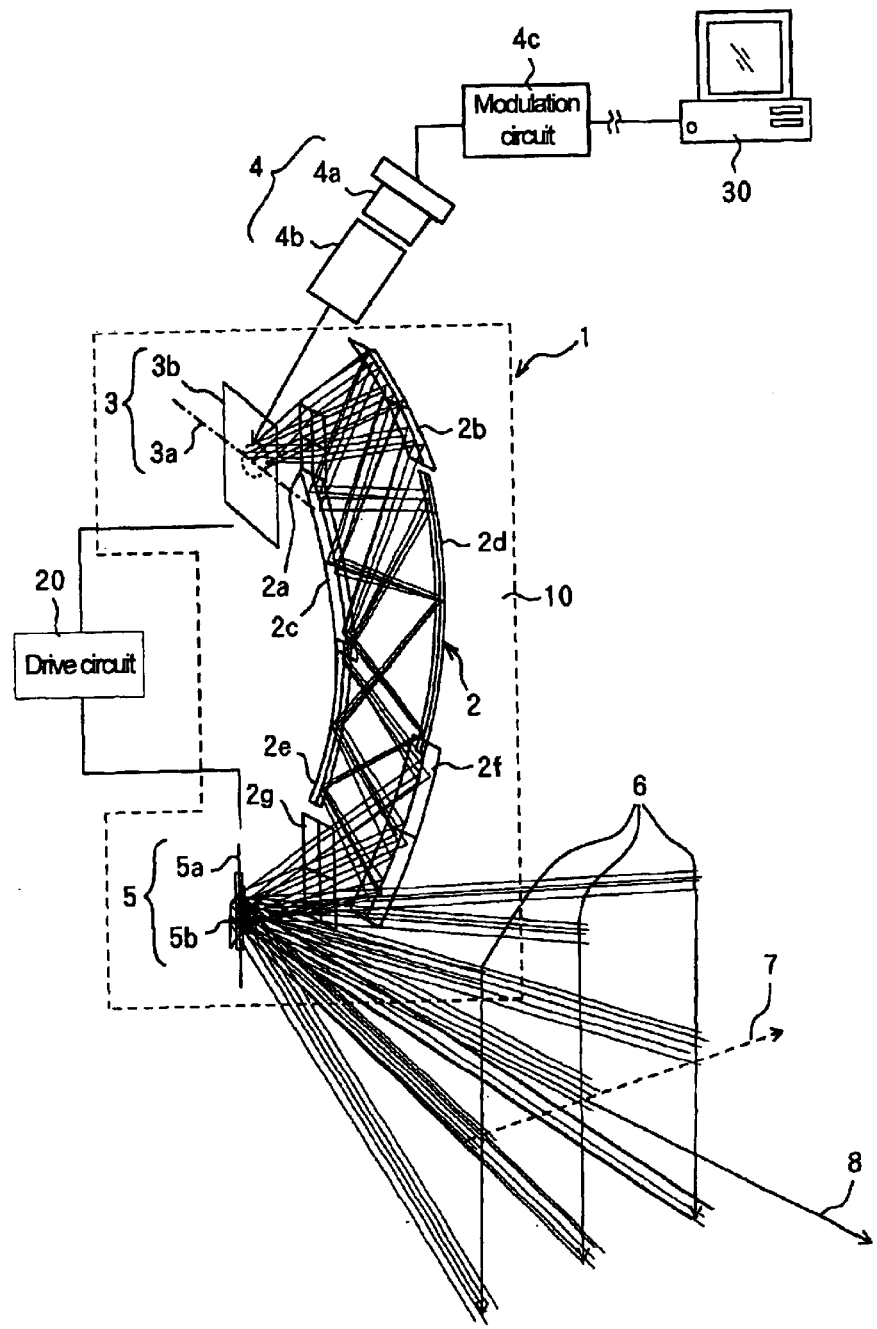
FIG. 1 is a block diagram of a scanning type image display apparatus of Embodiment 1 of the present invention.

Hereinafter, preferred embodiments of the invention will be described in detail with reference to the drawings.

Before describing the embodiments of the present invention, common matters in the description are herein explained.

The optical system of each embodiment is a non-coaxial (off-axial) optical system having no axis of rotational symmetry. Therefore, a reference axis corresponding to an axis of rotational symmetry is defined. Furthermore, the origin of the coordinate system in an absolute space is set to the center of a first surface in Embodiments. A light beam that passes through the center of a scanned surface (final image surface) and the center of the first surface and is perpendicular to an object surface is defined as a reference-axis ray (or a central principal ray), and an optical path that this reference-axis ray traces is defined as a reference axis. This reference axis has directivity that is the direction in which the reference-axis ray advances for forming an image.

Furthermore, in the Embodiments, the reference axis is defined as mentioned above, and this is an example for easily describing the optical system. Therefore, if the setting of the coordinate system changes, the description of the optical system also changes. However, the description is not limited since the same effect can be obtained if similar description is given in the case of the abovementioned setting.

In the Embodiments, a path is defined as a reference axis, which the reference-axis ray that passes the center of the first surface in the absolute coordinate system and reaches the center of the scanned surface (final image surface) traces while being influenced by refractive and reflective action by optical surfaces such as refractive surfaces and reflective surfaces, and optical surfaces are expressed as i-th surfaces in order of being influenced by refractive or reflective action.

Furthermore, the optical surfaces forming the optical systems of the Embodiments are tilted with respect to the other optical surfaces, and the degrees of these tilts are expressed by the following method.

When the three-dimensional coordinate axes in the absolute coordinate system are set as a Z axis, a Y axis, and an X axis, Z axis: straight line that passes from the center of the 0th surface (object surface) to the center of the first surface (origin of the absolute coordinate system), where the direction of this axis is defined as positive, Y axis: straight line that passes through the center of the first surface (origin of the absolute coordinate system), and has an angle of 90 degrees counterclockwise from the Z axis, Z axis: straight line that passes through the abovementioned origin, and is perpendicular to the Z axis and the Y axis.

The surface shape of the i-th surface forming the optical system is described by setting a local coordinate system in which the intersection between the reference axis and the i-th surface is set as the origin and by using a function based on this local coordinate system. The tilt angle of the i-th surface within the YZ plane is expressed as an angle $\theta i$ (unit: degree) by setting the counterclockwise direction as positive with respect to the Z axis in the absolute coordinate system.

In the Embodiments, the tilt angle is set only within the YZ plane. The y and z axes of the local coordinate system (x, y, z) for the i-th surface are within the YZ plane of the absolute coordinate system, and are tilt by an angle $\theta i$ within the YZ plane. When the three-dimensional coordinate axes are set as a z axis, a y axis, and an x axis, z axis: straight line that passes through the origin of the local coordinate system, and has an angle $\theta i$ counterclockwise from the Z axis of the absolute coordinate system within the YZ plane, y axis: straight line that passes through the origin of the local coordinate system, and has an angle of 90 degrees counterclockwise from the z direction within the YZ plane, x axis: straight line that passes through the origin of the local coordinate system and is perpendicular to the YZ plane.

Furthermore, in the numerical example corresponding to each Embodiment, Yi and Zi denote the coordinates of the origin of the local coordinate system of i-th surface in the absolute coordinate system. Di denotes the distance between the origins of the i-th surface and the (i+1)th surface, Ndi and vdi denote the refractive index and Abbe's number, respectively, of the d line between the i-th surface and the (i+1)th surface.

Furthermore, the shape of the rotationally asymmetric surface having no axis of rotational symmetry is expressed by the following function expression.

$$z = C02y^2 + C20x^2 + C03y^3 + C12xy^2 + C21x^2y + \quad \text{[Expression 1]}$$
$$C30x^3 + C04y^4 + C13xy^3 + C22x^2y^2 + C31x^3y +$$
$$C40x^4 + C05y^5 + C14xy^4 + C23x^2y^3 + C32x^2y^3 +$$
$$C41x^4y + C50x^5 + C06y^6 + C15xy^5 + C24x^2y^4 +$$
$$C33x^3y^3 + C42x^4y^2 + C51x^5y + C60x^6 + \ldots$$

This function defines the surface shape by the local coordinate system (x, y, z) of the i-th surface.

Furthermore, in the same function expression, a surface that is symmetrical with respect to the yz plane can be obtained by setting a term relating to the odd-numbered order of x in the local coordinate system.

Furthermore, in the Embodiments, a part of all optical surfaces use a rotationally symmetrical aspheric surface having rotational symmetry, and the shape thereof is expressed as follows:

$$z = \frac{(h^2)/R_i}{1 + \{1 - (1+k)h^2/Ri^2\}^{1/2} +} \quad \text{[Expression 2]}$$
$$Ah^2 + Bh^4 + Ch^6 + Dh^8 + Eh^{10} + \ldots$$

Herein, $$h^2 = x^2 + y^2$$

This rotationally symmetrical aspheric surface is also defined by each local coordinate system.

Embodiment 1

FIG. 1 shows the general structure of a scanning type image display apparatus having a scanning type display optical system of Embodiment 1 of the present invention.

In FIG. 1, the reference numeral 1 denotes the scanning type image display apparatus of the present Embodiment, 4 denotes a light source optical system, and 10 denotes a scanning optical system. The light source optical system 4 and the scanning optical system 10 form the scanning type display optical system. The scanning type image display apparatus comprises the scanning type display optical system, a modulation circuit 4c and a drive circuit 20.

The scanning optical system 10 comprises a horizontal scanning device (first scanning device) 3, a vertical scanning device (second scanning device) 5, and a light guiding optical system 2 including reflective surfaces 2b, 2c, 2d, 2e, and 2f.

The light source optical system 4 comprises a light source 4a such as a semiconductor laser, etc., that can be modulated and a condenser optical system 4b. The modulation circuit 4c is electrically connected to the light source 4a. To the modulation circuit 4c, an image information supply apparatus 30 such as a personal computer, a television, a video player, or a DVD player, a digital camera (still and video camera) etc., is connected. The modulation circuit 4c modulates the light source 4a according to image information inputted from the image information supply apparatus 30.

The modulated light emitted from the light source 4a is made incident on the condenser optical system 4b and is collimated (or condensed). The collimated (or condensed) modulated light is made incident on the horizontal scanning device 3, which is electrically connected to and driven by the drive circuit 20.

In the horizontal scanning device 3, a reflective surface 3b oscillates around a rotation axis 3a to reflect and deflect the incident light and scan it horizontally.

The modulated light that has been reflected and deflected by the horizontal scanning device 3 is made incident on the light guiding optical system 2. The light guiding optical system 2 has an entrance aperture 2a and an exit aperture 2g, and between these, the reflective surfaces 2b through 2f having no axis of rotational symmetry (that is, having rotationally asymmetric shapes) are disposed. The light that has been made incident on the light guiding optical system 2 from the entrance aperture 2a advances to the exit aperture 2b while being reflected by the reflective surfaces 2b through 2f in order, and then emerges from the exit aperture 2b. The entrance aperture 2a, the exit aperture 2b, and the reflective surfaces 2b through 2f may be formed on the surface of an integrated transparent member, or the reflective surfaces 2b through 2f are formed as separate mirrors.

The light that has emerged from the light guiding optical system 2 is made incident on the vertical scanning device 5 which is electrically connected to and driven by the drive circuit 20. The vertical scanning device 5 is structured so that a reflective surface 5b oscillates around a rotation axis 5a to reflect and deflect the incident light and scan it in the vertical direction orthogonal to the light scanning direction of the horizontal scanning device 3.

Then, due to horizontal and vertical deflection by the horizontal scanning device 3 and the vertical scanning device 5, it is possible to two-dimensionally scan the light beam from the light source 4a. Luster scanning is carried out by synchronizing modulation of the light source 4a and operations of the scanning devices 3 and 5, whereby an image can be projected and displayed on a scanning surface (see the reference numeral 9 in FIG. 2) such as a screen, etc. In FIG. 1, the direction toward the scanning surface is shown by an arrow 8. In FIG. 1, arrows 6 indicate the horizontal scanning direction, and an arrow 7 indicates the vertical scanning direction.

Figure 2:
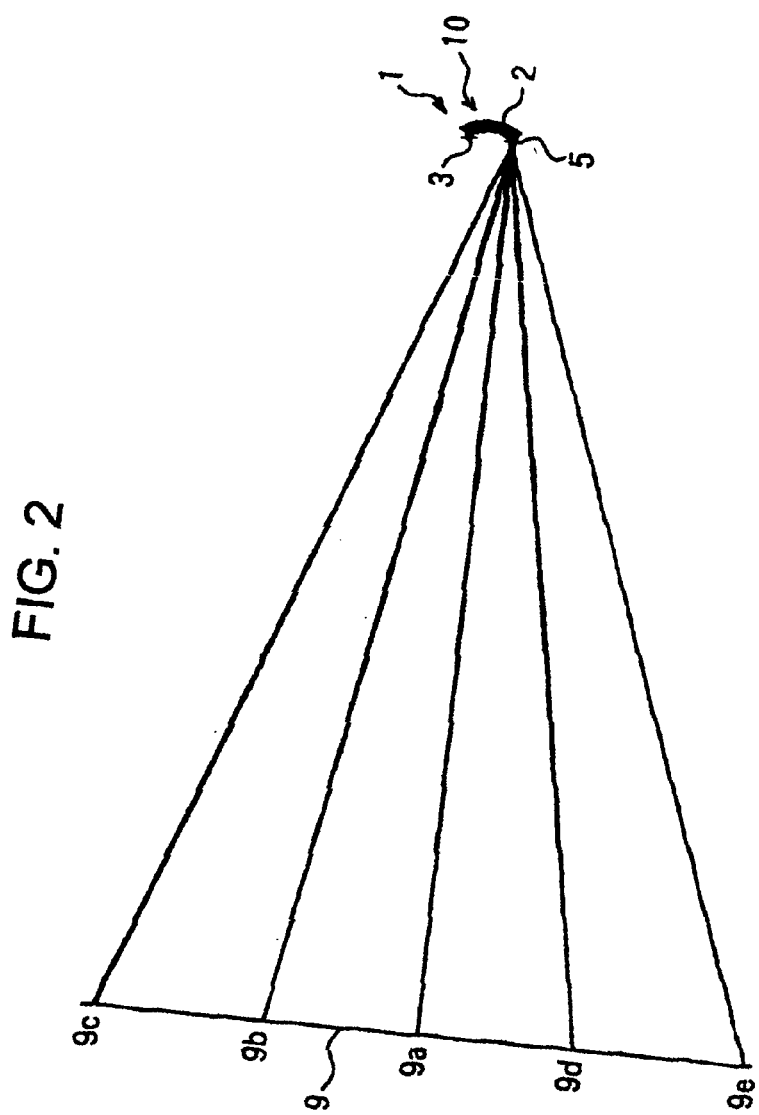
FIG. 2 is a schematic view showing a condition of light scanning on a screen by the scanning type image display apparatus shown in FIG. 1.

Hereinafter, a detailed structure of the optical system of the image display apparatus 1 of this embodiment is described. FIG. 2 shows a section in the horizontal scanning direction (main scanning direction) of the image display apparatus. In FIG. 2, for clearly showing the optical path of the light beam that has emerged from the vertical scanning device 5 shown in FIG. 1, one cycle of horizontal scanning is collectively shown. In FIG. 2, the light source optical system 4 is omitted, and the optical paths of a light beam deflected horizontally by the horizontal scanning device 3 are shown.

The light beam that has been deflected by the horizontal scanning device 3 and the vertical scanning device 5 and emerged from the scanning optical system 10 is scanned on the screen 9.

The reference numerals 9a through 9e in this figure denote examples of scanning points on the screen 9, and the scanning point moves from 9e, 9d, 9a, 9b, and 9c in this order along with light deflection by the horizontal scanning device 3.

Figure 3:
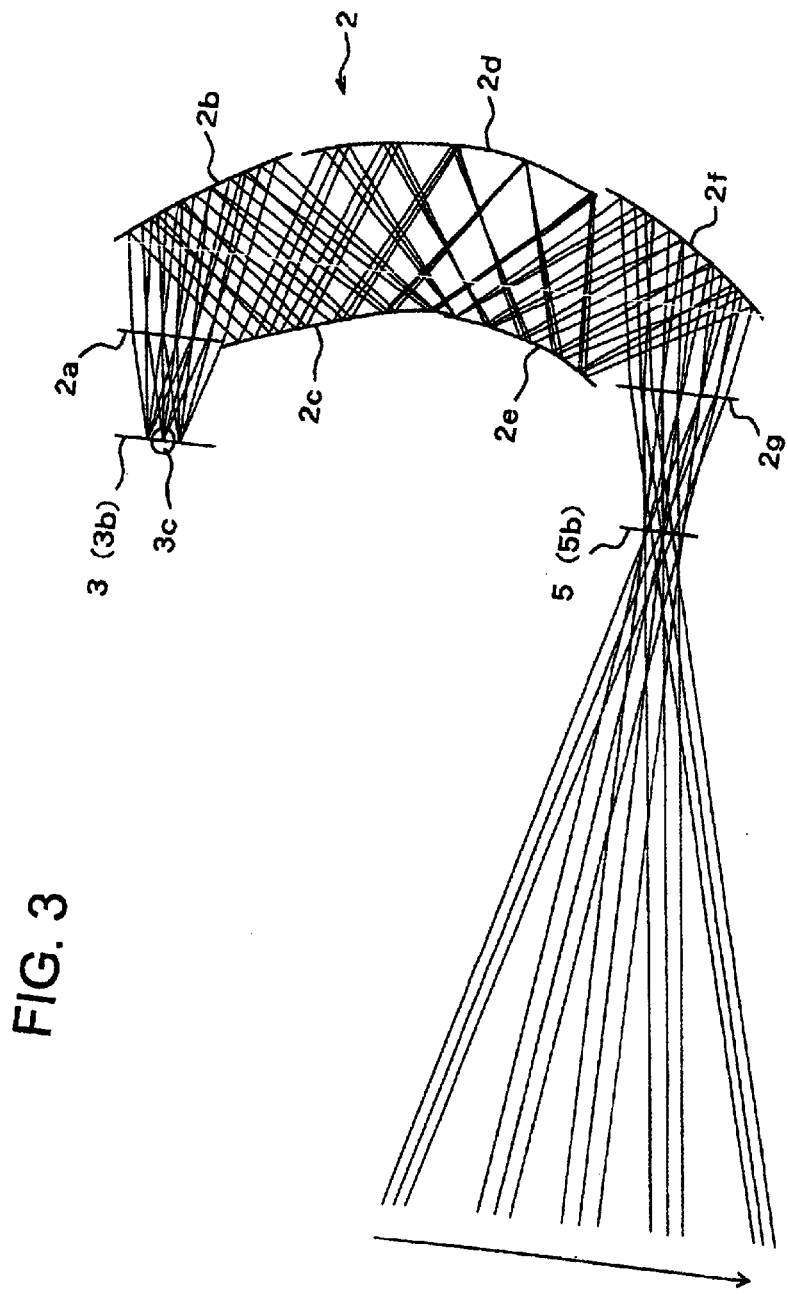
FIG. 3 is a sectional view of an optical system of the scanning type image display apparatus shown in FIG. 1.

In FIG. 3, the optical system of the image display apparatus 1 of this embodiment is shown in detail. FIG. 3 also shows a section in the horizontal scanning direction. (as same as FIG. 2). FIG. 3 shows optical paths of light beams from the light source 4a shown in FIG. 1 (light beams collimated (or condensed) by the light source optical system 4b) after being deflected by the horizontal scanning device 3. Herein, the optical paths of light beams that are made incident on the vertical scanning device 5 and then advance toward the screen 9 shown in FIG. 2 are developed. In actuality, the optical paths are turned toward the direction perpendicular to the paper surface of FIG. 3 by the vertical scanning device 5.

Herein, the horizontal scanning device 3 used in this embodiment is a resonance scanning type device in which the deflection angle of the reflective surface 3b is +/−11.7 degrees.

Figure 8:
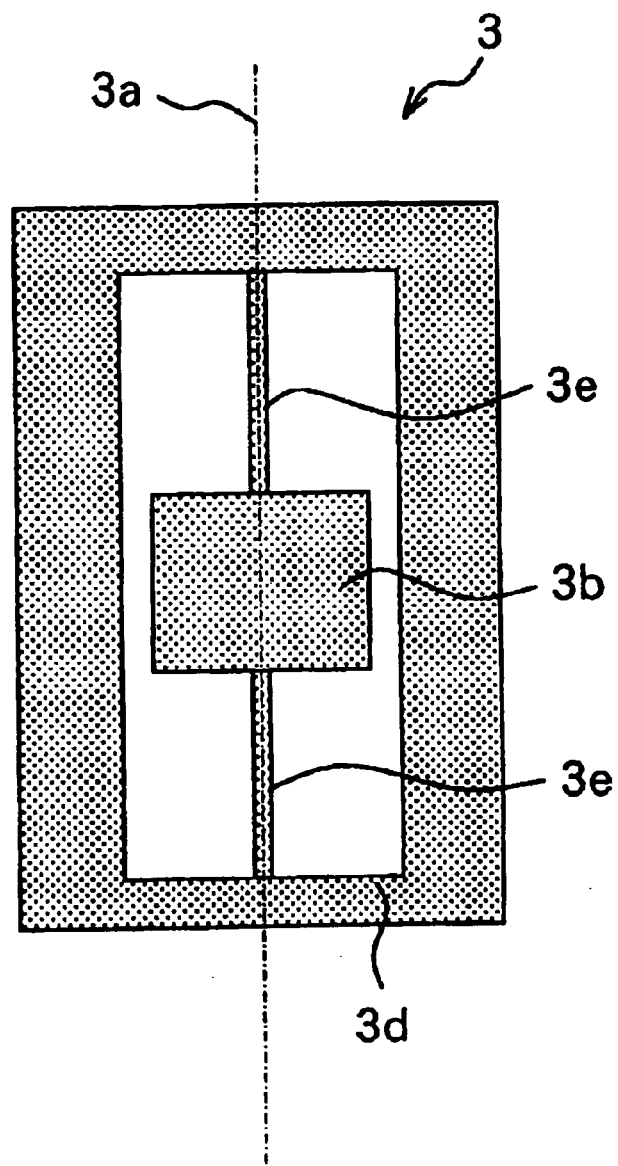
FIG. 8 is a schematic view showing the structure of a scanning device used in the scanning type image display apparatus shown in FIG. 1.

The horizontal scanning device 3 that is a scanning type device is structured as shown in, for example, FIG. 8. The scanning type device is a Micro Electro Mechanical System (MEMS) device produced by the semiconductor processes, etc., and has the reflective surface (horizontal scanning surface) 3b and the axis 3a that is the center of oscillation of this reflective surface 3b. The reflective surface 3b is joined to a base portion 3d by joints 3e, and a mechanical resonance frequency is set based on this structure.

By externally applying a cyclic (periodic) force, it becomes possible to tilt the reflective surface 3b with respect to the axis 3a. By this tilt of the reflective surface 3b, it becomes possible to deflect incident light. As this external power, an electromagnetic force or an electrostatic force can be used.

When the maximum amplitude of the reflective surface 3b is defined as $\Phi max$, the deflection angle becomes two times this maximum amplitude and is expressed as follows:

$$\theta = 2\Phi max \cdot \sin(\omega t)$$

Herein, $\omega$ denotes the angular frequency of the horizontal scanning device 3, and t denotes time.

In this embodiment, $\theta max = 11.7$ degrees. In such a resonance type scanning device, as understood from the expression above, the scanning rate becomes 0 in a condition of the maximum amplitude. Therefore, it is necessary to set a ratio of effective amplitude (effective amplitude $\theta eff$) to the maximum amplitude, and the ratio is 0.75 in this embodiment.

Namely, $$\theta eff = 0.75\Phi, \text{ and}$$

an image is displayed at $\theta$ that is in a range of $\theta < \theta eff$.

A numerical example is shown below. Herein, in Numerical example 1, the reflective surface 3b of the horizontal scanning device 3 in FIG. 3 is the first surface, and furthermore, the axis 3c of the reflective surface 3b shown in FIG. 3 attains the standards of the decentering amount data. Furthermore, Numerical example 1 shows a case where the entrance aperture (transmissive surface) 2a, the exit aperture (transmissive surface) 2g, and the reflective surfaces 2b through 2f, forming the light guiding optical system 2 are formed on the surface of an integrated transparent member. Correspondence between the respective optical surfaces in FIG. 3 and Numerical example 1 is as follows. FIG. 3 Numerical Example 1

Transmissive surface 2a . . . Second surface
Reflective surface 2b . . . Third surface Reflective surface 2c ... Fourth surface
Reflective surface 2d ... Fifth surface
Reflective surface 2e ... Sixth surface
Reflective surface 2f ... Seventh surface
Transmissive surface 2g ... Eighth surface Furthermore, the vertical scanning device 5 shown in FIG. 3 has the same structure as that of the horizontal scanning device 3, and the reflective surface (vertical scanning surface) 5b thereof is set as the ninth surface in Numerical example 1.

NUMERICAL EXAMPLE 1

Horizontal scanning angle: ±23.4 degrees (optical angle)
Effective scanning amplitude ratio: 0.75
Entrance pupil diameter: 1.0 mm ($1^{st}$. scanning device position)

Decentering amount data
(taking the first surface as the reference)

| i | $Y_i$ | $Z_i$ | $\theta_i$ | $D_i$ | $N_i$ | $v_i$ | |
|---|---|---|---|---|---|---|---|
| 1 | 0.00 | 0.00 | 0.00 | 3.00 | 1 | | horizontal scanning surface (aperture stop) |
| 2 | 0.00 | 3.00 | 0.00 | 4.00 | 1.49171 | 57.40 | transmissive surface |
| 3 | 0.00 | 7.00 | 30.00 | 6.00 | 1.49171 | 57.40 | reflective surface |
| 4 | −5.20 | 4.00 | 15.00 | 6.00 | 1.49171 | 57.40 | reflective surface |
| 5 | −8.20 | 9.20 | 0.00 | 6.00 | 1.49171 | 57.40 | reflective surface |
| 6 | −11.20 | 4.00 | −15.00 | 6.00 | 1.49171 | 57.40 | reflective surface |
| 7 | −16.39 | 7.00 | −30.00 | 4.00 | 1.49171 | 57.40 | reflective surface |
| 8 | −16.39 | 3.00 | 0.00 | 4.00 | 1 | | transmissive surface |
| 9 | −16.39 | −1.00 | 0.00 | 400.00 | 1 | | vertical scanning surface (reflective surface) |
| img | −16.39 | −401.00 | 0.00 | | 1 | | image surface |

Coefficients of the surfaces are shown below. "e−00x" denotes" $\times 10^{-x}$".
Surface shape data
Second surface (rotationally symmetrical aspheric surface)
R2=2545.105
k=2962436.422
A=0.00000e+000
B=8.73862e−004
Third surface (rotationally asymmetric surface)
C02=−1.99635e−002 C20=−2.16777e−002
C03=1.40372e−003 C21=3.22217e−003
C04=2.13663e−004 C22=7.19634e−004 C40=3.81638e−004
Fourth surface (rotationally asymmetric surface)
C02=−1.58809e−002 C20=3.46773e−002
C03=2.94312e−003 C21=7.95113e−003
C04=−3.04557e−004 C22=−9.07165e−004 C40=2.05126e−003
Fifth surface (rotationally asymmetric surface)
C02=−3.39284e−002 C20=−1.42922e−001
C03=1.22241e−003 C21=3.01619e−003
C04=−1.42714e−004 C22=−3.65087e−003 C40=−3.79846e−002
Sixth surface (rotationally asymmetric surface)
C02=−3.78188e−002 C20=−8.33919e−002
C03=3.64494e−003 C21=9.82786e−004
C04=−1.09621e−003 C22=−8.31393e−003 C40=3.50857e−003
Seventh surface (rotationally asymmetric surface)
C02=−2.18136e−002 C20=−2.43335e−002
C03=6.54222e−005 C21=1.15559e−003
C04=−4.04450e−004 C22=−1.34127e−003 C40=−8.59852e−004
Eighth surface (rotationally symmetrical aspheric surface)
R8=15.458
k=14.066
A=−4.89160e−003
B=−1.14510e−004

Figure 9:
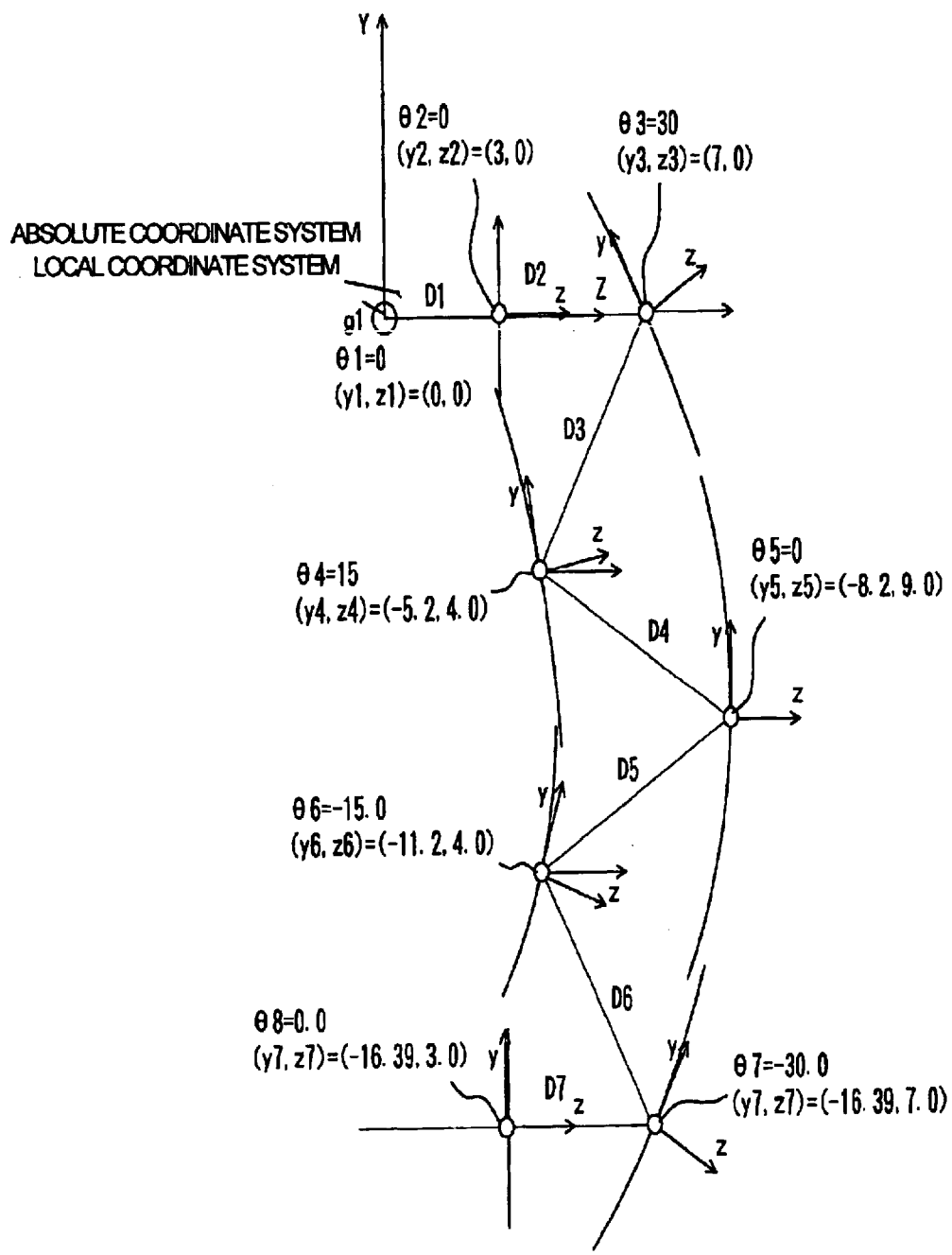
FIG. 9 is an explanatory view of a coordinate system for indicating the optical system of the scanning type image display apparatus shown in FIG. 1.

The decentering amount data and the surface shape data in the above are data on the coordinate system shown in FIG. 9. The same applies to numerical examples described hereinafter.

Figure 4:
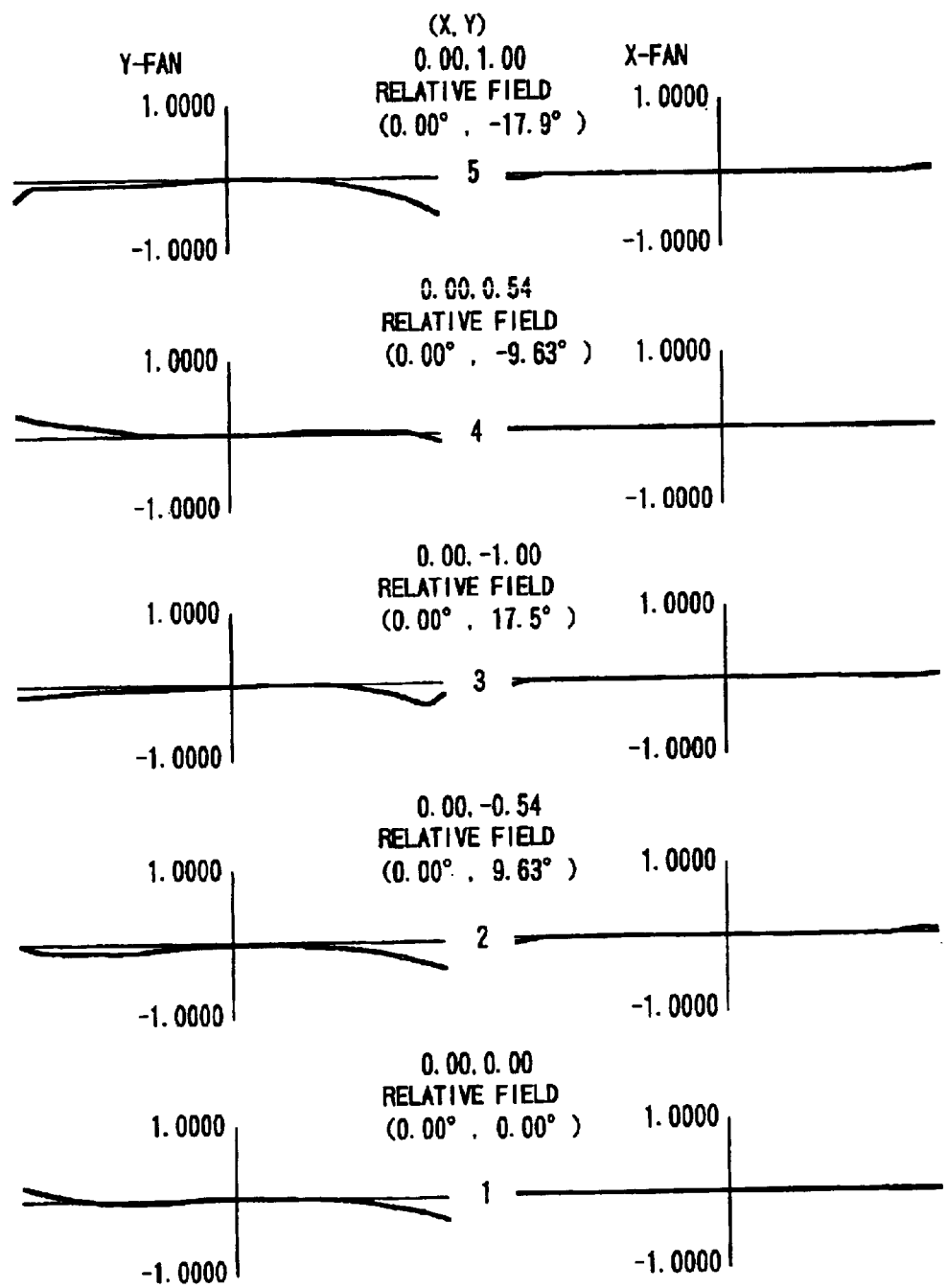
FIG. 4 is a lateral aberration diagram (in main scanning direction) of the optical system of the scanning type image display apparatus shown in FIG. 1.

FIG. 4 is a lateral aberration diagram within the plane shown in FIG. 3 in Numerical example 1. The wavelength of the light beam is set to 532 nm. This wavelength is for showing optical performance of the present embodiment, therefore the light beam from the light source 4a does not necessarily have this wavelength.

In this embodiment, the optical maximum scanning angle by the horizontal scanning device 3 is ±23.4 degrees, and optical performance of a beam diameter of 1.0 mm up to the ratio of 0.75 (±17.5 degrees) to the maximum scanning angle is shown. From FIG. 4, it is clear that lateral aberration performance of this embodiment is excellent.

Furthermore, in this range, the deflection angle θ of the reflective surface 3b of the horizontal scanning device 3 that resonates is:

$$\theta = 2\Phi_{max} \cdot \sin(\omega t),\text{ and}$$

the reflective surface 3b is provided with characteristics of sinusoidal operations so that temporal movements of the scanning point have even intervals.

With this structure, it becomes possible to reduce the burden on the modulation circuit 4c shown in FIG. 1, which modulates the light source 4a.

Furthermore, as understood in the optical path diagram of FIG. 3, the reflective surface 3b of the horizontal scanning device 3 and the reflective surface 5b of the vertical scanning device 5 are made substantially conjugate to each other by the light guiding optical system 2. Therefore, the reflective surface 5b of the vertical scanning device 5 can be reduced in size.

Figure 5:
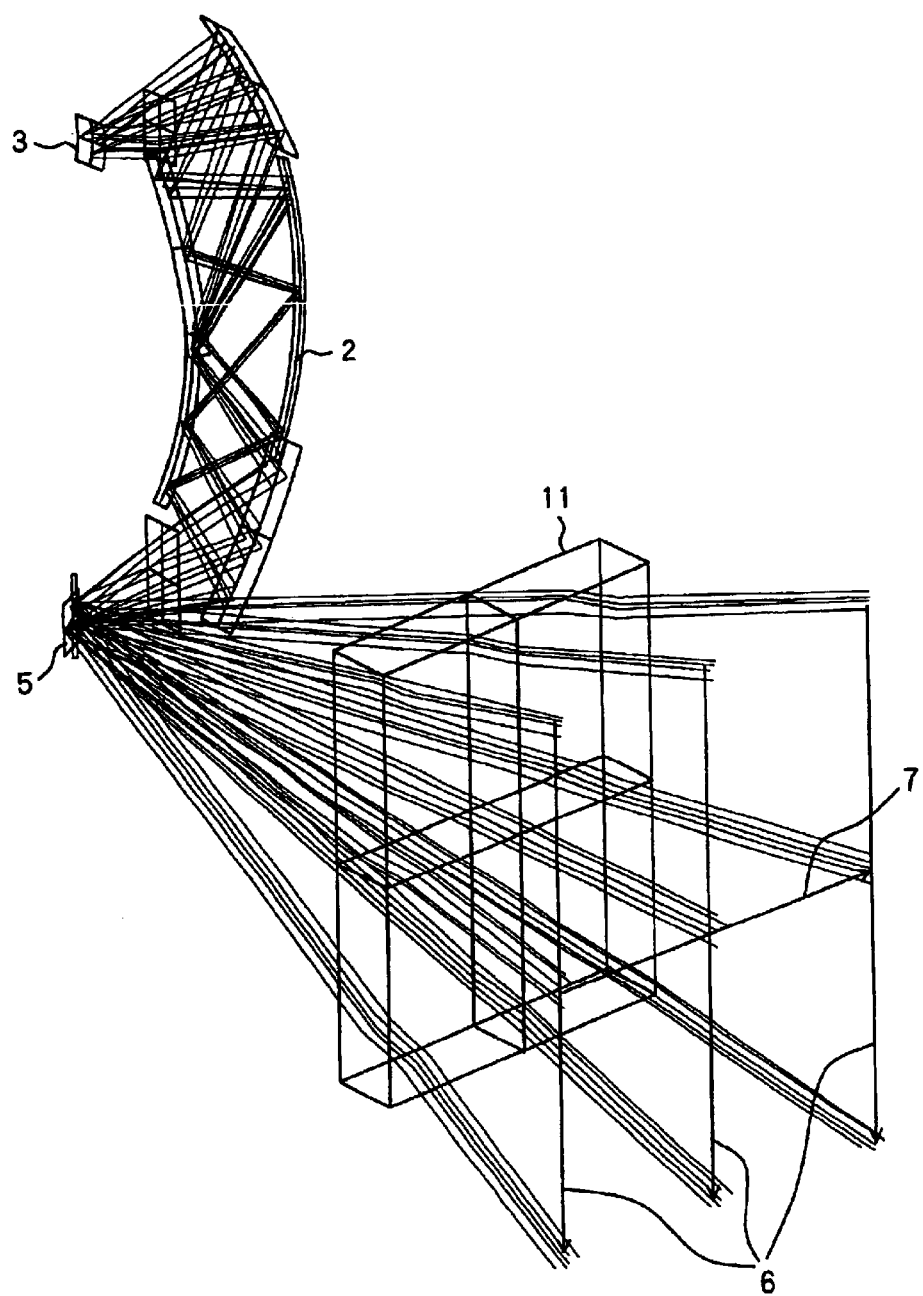
FIG. 5 is a block diagram of a modification example of the scanning type image display apparatus shown in FIG. 1.

FIG. 5 shows an outline of a case where light beams that have been scanned horizontally by the horizontal scanning device 3 and scanned vertically by the vertical scanning device 5 via the light guiding optical system 2 are projected onto the screen (see FIG. 2) via an optical system 11. In FIG. 5, the arrows 6 show the horizontal scanning direction, and arrow 7 shows the vertical scanning direction. The optical system 11 is formed of a glass plate both sides of which are plane.

The optical system 11 has a function for protecting the scanning devices 3 and 5 and the light guiding optical system 2. Furthermore, by making the optical system 11 to be aspheric or rotationally asymmetric surface, optical performance of this scanning type display optical system can be improved.

Figure 6:
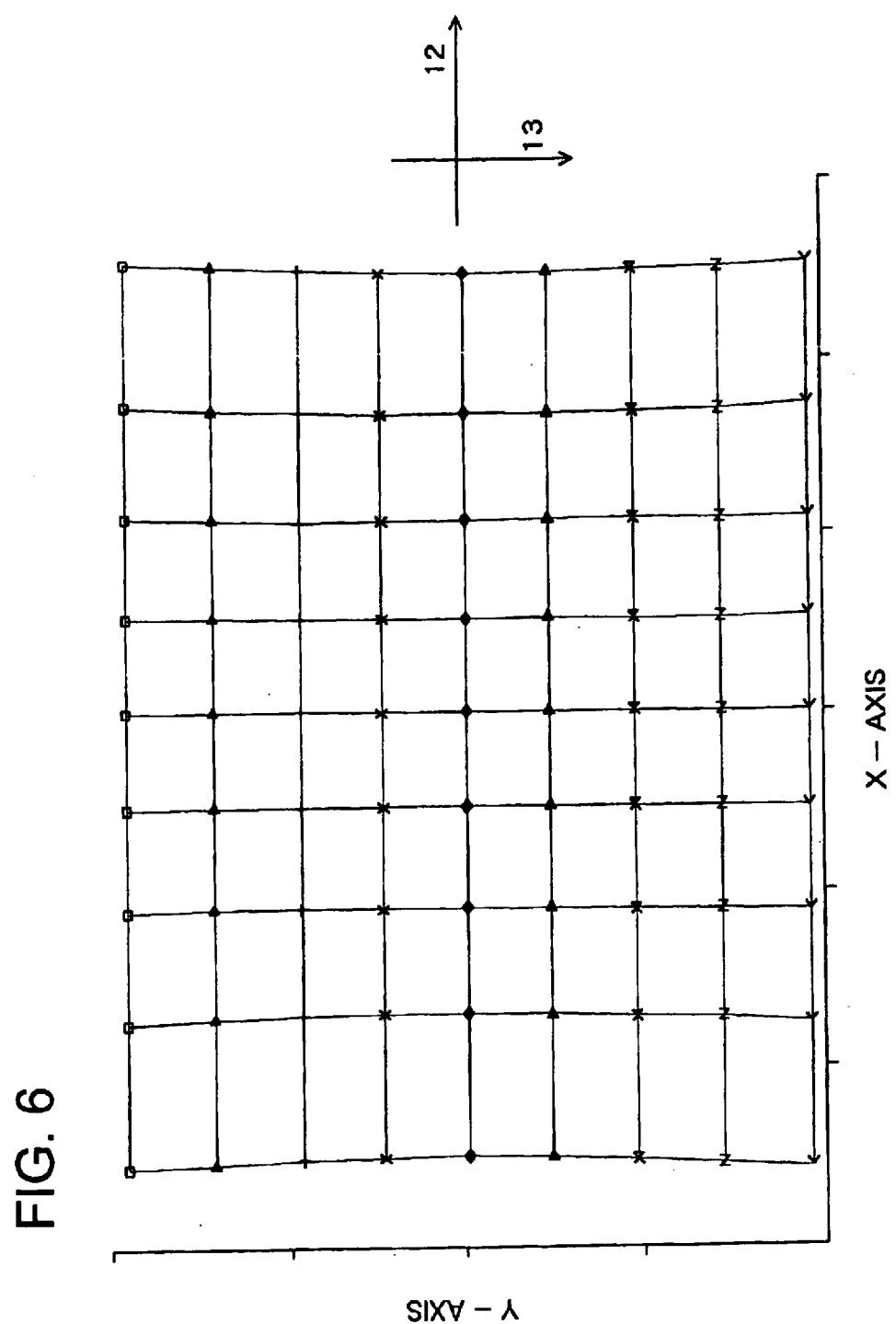
FIG. 6 is a schematic view of scanning lines on a screen by the scanning type image display apparatus shown in FIG. 1.

FIG. 6 shows distortion of a two-dimensional image (projected image) scanned and displayed by the projection type image display apparatus 1 of this embodiment, the horizontal scanning direction is shown by arrow 12, and the vertical scanning direction is shown by arrow 13 in the figure.

As seen in this figure, distortion occurs in the horizontal scanning direction (main scanning direction) at the center of the projected image and the upper side or lower side of the projected image due to the structure of the scanning optical system. This distortion can be corrected by adjusting the modulation signal of the light source 4a or the deflection angle of the horizontal scanning device 3. Furthermore, distortion correction can also be carried out by the optical system 11 in FIG. 5.

Figure 7A:
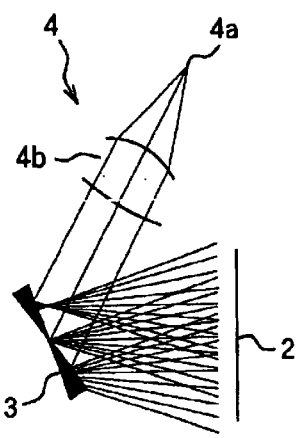
FIGS. 7(A), 7(B) and 7(C) are schematic views showing examples of the structure of a light source optical system used in the scanning type image display apparatus shown in FIG. 1.
Figure 7B:
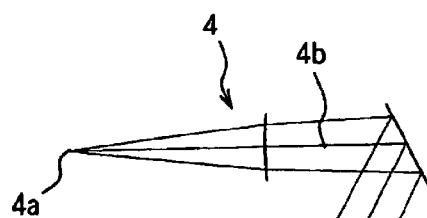
Figure 7C:
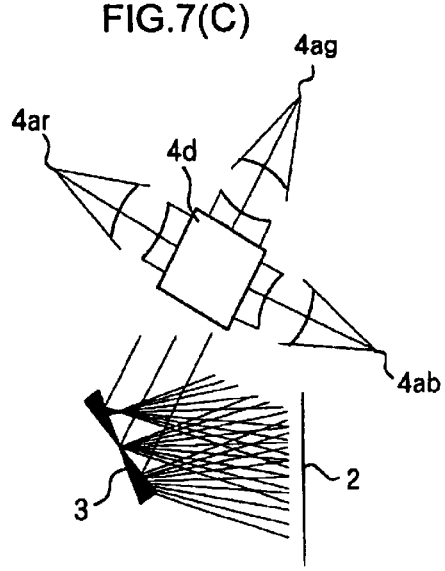

FIGS. 7(A) through 7(C) show examples of the detailed structure of the light source optical system 4 that is schematically shown in FIG. 1. All of these structure examples are formed so that a light beam from the light source 4a is made parallel by the condenser optical system 4b and made incident on the horizontal scanning device 3.

Furthermore, FIGS. 7(A) through 7(C) also show optical paths of the light beams scanned by the horizontal scanning device 3, and scanned light beams are made incident on the light guiding optical system 2.

The light source optical system 4 may be structured by disposing a reflective surface within the optical system 4b as shown in FIG. 7(B) other than the structure shown in FIG. 7(A) in that the light beam from the light source 4a is made incident on the horizontal scanning device 3 without reflection. Thereby, the degree of freedom in arrangement of the light source 4a increases.

Furthermore, FIG. 1 and FIGS. 7(A) and 7(B) show a case where only one light source 4a is provided, however, as shown in FIG. 7(C), it is also possible that light sources 4ar, 4ag, and 4ab which emit red-, green-, and blue-color lights are provided, and color lights from these light sources 4ar, 4ag, and 4ab are combined by a color combining optical element 4d such as a dichroic prism and made incident on the horizontal scanning device 3.

Furthermore, in this embodiment, a light source which can be directly modulated is shown as the light source 4a. For example, a light source such as a semiconductor laser or an LED can be used. The same effect can also be obtained by using a wavelength converting laser using a semiconductor laser or using a method in which a light source such as a solid-state laser is made to continuously emit light beam and the light beam is modulated with an optical modulator.

In this embodiment, as aforementioned, the light guiding optical system 2 in the scanning optical system 10 is formed of an integrated transparent member having an incident surface (entrance aperture: second surface) and an emergent surface (exit aperture: eighth surface) on its surface. With this structure, it becomes possible to integrally form the light guiding optical system 2, and this is advantageous for securing positional accuracies of the respective surfaces and reduces the size of the light guiding optical system 2.

It is preferable that a silver or aluminum thin film is formed on the surfaces forming the reflective surfaces of the transparent member by means of deposition to increase the reflectance. As a material to form the transparent member, optical transparent glass or resin materials can be used. The same applies to embodiments described below.

Furthermore, the light guiding optical system 2 may be formed by combining a plurality of mirrors or combining two or more divided transparent members without being formed by forming the respective surfaces on one transparent member as mentioned above. Furthermore, the number of reflective surfaces of the light guiding optical system is not limited to the number used in this embodiment, and a refractive element such as a lens may be inserted within the light guiding optical system. The same also applies to embodiments described below.

Embodiment 2

Figure 10:
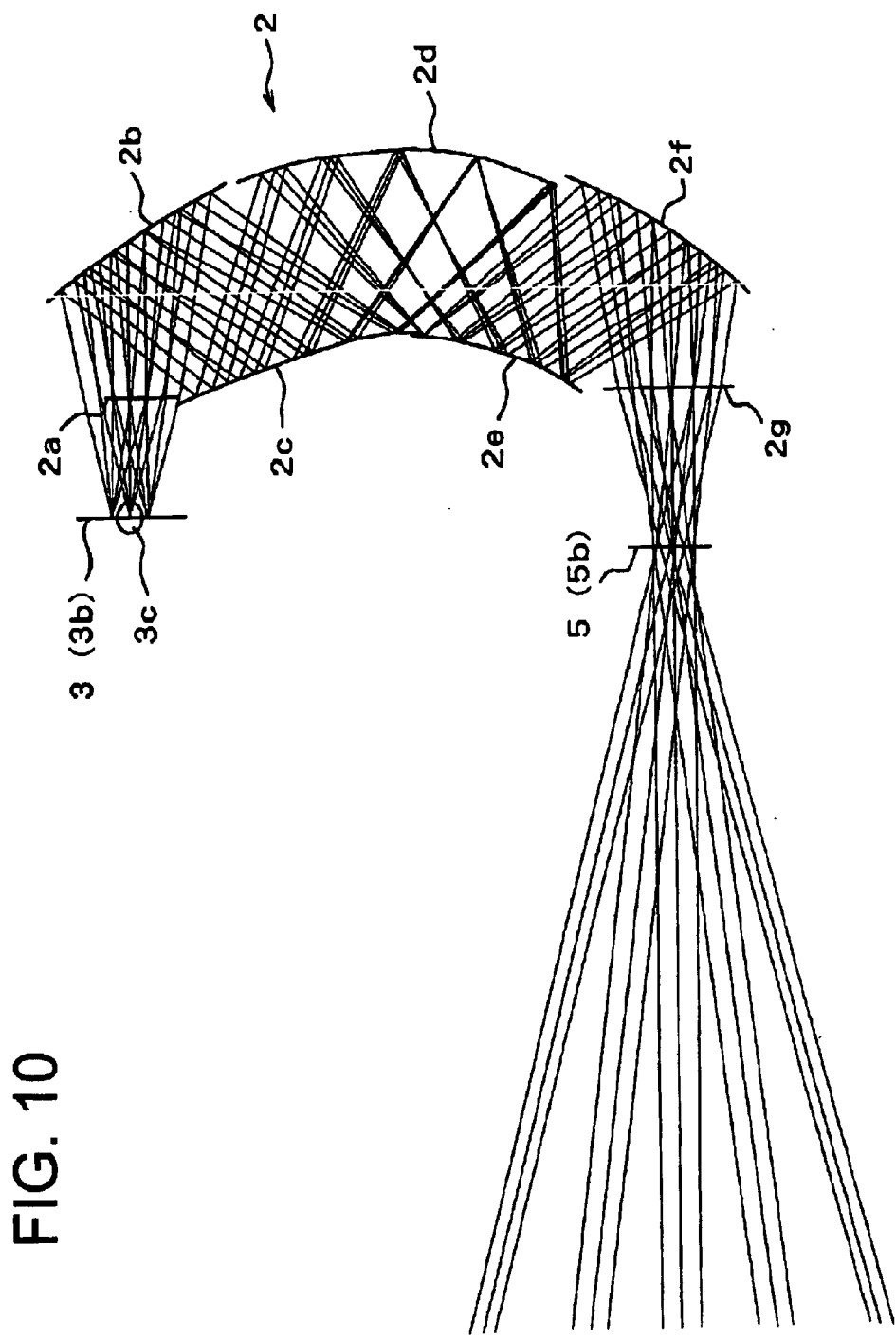
FIG. 10 is a block diagram of a scanning type image display apparatus of Embodiment 2 of the present invention.

FIG. 10 shows another structure of a scanning type image display apparatus having a scanning type display optical system of Embodiment 2 of present invention. In this embodiment, components corresponding to the components in Embodiment 1 are attached with the same reference numerals and description thereof is omitted.

FIG. 10 shows the optical paths of light beams after being deflected by the horizontal scanning device 3, which has been emitted from the light source 4a (see FIG. 1) and then collimated (or condensed) by the condenser optical system 4b (see FIG. 1). Herein, the optical paths of the light beams that are made incident on the vertical scanning device 5 and then advance toward the screen (see the reference numeral 9 in FIG. 2) are developed. In actuality, the optical paths of the light beams are turned toward the direction perpendicular to the paper plane of FIG. 10 by the vertical scanning device 5.

In this embodiment, the horizontal scanning device 3 is a resonance scanning type device having a deflection angle of +/−11.7 degrees, and has the same structure as that shown in FIG. 8.

When the maximum amplitude of the reflective surface 3b is defined as $\Phi max$, the deflection angle becomes two times this maximum amplitude and is expressed as:

$$\theta = 2\Phi max \cdot \sin(\omega t)$$

Herein, $\omega$ denotes the angular frequency of the horizontal scanning device 3, and t denotes time.

In this embodiment, $\theta max = 11.7$ degrees. In such a resonance type scanning device, as understood from the above expression, the scanning rate becomes 0 in a condition of maximum amplitude. Therefore, it is necessary to set the ratio of effective amplitude (effective amplitude $\theta eff$) to the maximum amplitude, and the ratio is 0.75 in this embodiment.

Namely, $$\theta eff = 0.75\Phi, \text{ and}$$

an image is displayed at $\theta$ in a range of $\theta < \theta eff$.

A numerical example of this embodiment is shown below. In Numerical example 2, the reflective surface 3b of the horizontal scanning device 3 in FIG. 10 is set as the first surface, and furthermore, the axis 3c of the reflective surface 3b shown in FIG. 10 attains the standards of decentering amount data. Furthermore, Numerical example 2 shows a case where the entrance aperture (transmissive surface) 2a, the exit aperture (transmissive surface) 2g, and the reflective surfaces 2b through 2f which form the light guiding optical system 2 are formed on the surface of an integrated transparent member. Correspondence between the optical surfaces in FIG. 10 and Numerical example 2 is as follows.

FIG. 10 Numerical Example 2

Transmissive surface 2a . . . Second surface

Reflective surface 2b . . . Third surface

Reflective surface 2c . . . Fourth surface

Reflective surface 2d . . . Fifth surface
Reflective surface 2e . . . Sixth surface
Reflective surface 2f . . . Seventh surface
Transmissive surface 2g . . . Eighth surface Furthermore, the reflective surface 5b of the vertical scanning device 5 shown in FIG. 10 is set as the ninth surface in Numerical example 2.

NUMERICAL EXAMPLE 2

Horizontal scanning angle: ±23.4 degrees (optical angle)
Effective scanning amplitude ratio: 0.75
Entrance pupil diameter: 0.90

Decentering amount data
(taking the first surface as the reference)

| i | Yi | Zi | θi | Di | Ni | vi | |
|---|---|---|---|---|---|---|---|
| 1 | 0.00 | 0.00 | 0.00 | 3.00 | 1 | | horizontal scanning surface (aperture stop) |
| 2 | 0.00 | 3.00 | 0.00 | 4.00 | 1.49171 | 57.40 | transmissive surface |
| 3 | 0.00 | 7.00 | 30.00 | 6.00 | 1.49171 | 57.40 | reflective surface |
| 4 | −5.20 | 4.00 | 15.00 | 6.00 | 1.49171 | 57.40 | reflective surface |
| 5 | −8.20 | 9.20 | 0.00 | 6.00 | 1.49171 | 57.40 | reflective surface |
| 6 | −11.20 | 4.00 | −15.00 | 6.00 | 1.49171 | 57.40 | reflective surface |
| 7 | −16.39 | 7.00 | −30.00 | 4.00 | 1.49171 | 57.40 | reflective surface |
| 8 | −16.39 | 3.00 | 0.00 | 4.00 | 1 | | transmissive surface |
| 9 | −16.39 | −1.00 | 0.00 | 400.00 | 1 | | vertical scanning surface (reflective surface) |
| img | −16.39 | −401.00 | 0.00 | | 1 | | image surface |

Surface shape data
Second surface (rotationally symmetrical aspheric surface)
  R2=5031.497
  k=12453089.607
  A=0.00000e+000
  B=8.88059e−004
Third surface (rotationally asymmetric surface)
  C02=−1.99220e−002 C20=−2.11940e−002
  C03=1.45812e−003 C21=3.55282e−003
  C04=2.19747e−004 C22=7.86659e−004 C40=3.41014e−004
  C05=−8.06246e−007 C23=6.91705e−007 C41=−1.22480e−005
  C06=2.54819e−007 C24=8.64494e−007 C42 =1.34945e−005
  C60=−4.56969e−005
Fourth surface (rotationally asymmetric surface)
  C02=−1.58542e−002 C20=3.73784e−002
  C03=3.05302e−003 C21=8.28897e−003
  C04=−3.13180e−004 C22=−9.34388e−004 C40= 2.86243e−004
  C05=−9.31874e−008 C23=−1.05722e−006 C41=−9.35042e−007
  C06=−6.08265e−008 C24=−1.28600e−007 C42= 1.10115e−005
  C60=−3.27099e−004
Fifth surface (rotationally asymmetric surface)
  C02=−3.38570e−002 C20=−1.36047e−001
  C03=1.25921e−003 C21=2.40029e−003
  C04=−1.47702e−004 C22=−3.54776e−003 C40=−8.85879e−002
  C05=1.24099e−007 C23=3.80008e−007 C41=1.?8521e−004
  C06=−2.25862e−008 C24=−1.02876e−006 C42= 9.94983e−005
  C60=3.28817e−006
Sixth surface (rotationally asymmetric surface)
  C02=−3.77329e−002 C20=−7.53768e−002
  C03=3.94929e−003 C21=1.81005e−003
  C04=−1.20986e−003 C22=−8.32291e−003 C40=−2.01935e−002
  C05=3.03239e−006 C23=1.26476e−005 C41=−5.83902e−003
  C06=2.25995e−011 C24=−2.17474e−007 C42= 5.27657e−005
  C60=−5.03558e−002
Seventh surface (rotationally asymmetric surface)
  C02=−2.18351e−002 C20=−2.36122e−002
  C03=8.28165e−005 C21=1.23992e−003
  C04=−4.19502e−004 C22=−1.39328e−003 C40=−1.26428e−003
  C05=5.70228e−007 C23=7.96080e−008 C41=1.27018e−005
  C06=−9.57921e−009 C24=1.44592e−006 C42=−1.96574e−005
  C60=6.33748e−005
Eighth surface (rotationally asymmetric surface)
  R8=15.424
  k=6.793
  A=−4.77190e−003
  B=−1.15845e−004

Figure 11:
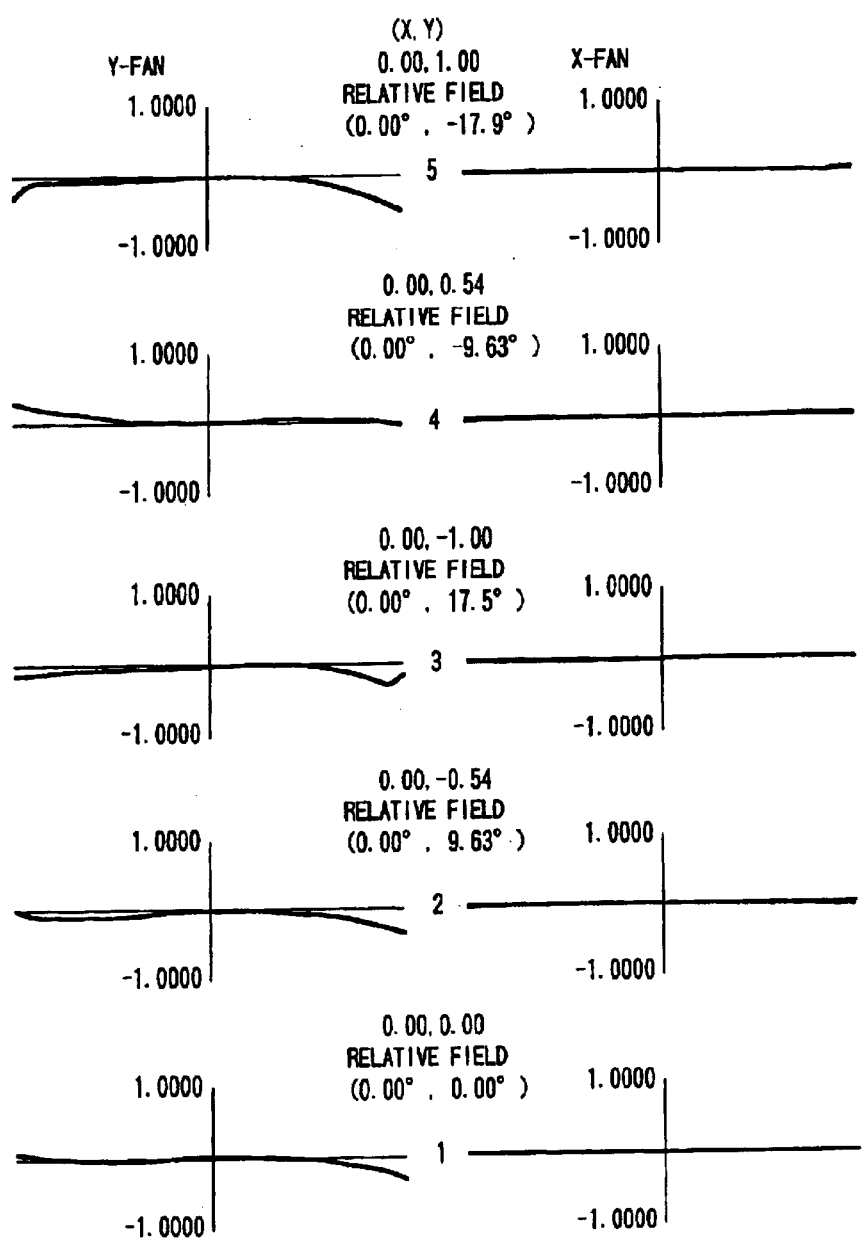
FIG. 11 is a lateral aberration diagram (in main scanning direction) of the optical system of the scanning type image display apparatus shown in FIG. 10.

FIG. 11 shows a lateral aberration diagram in Numerical example 2. The wavelength of the light beam is set to 532 nm. This wavelength is for showing optical performance of this embodiment, therefore the light beam from the light source 4a does not necessarily have this wavelength. In this embodiment, the optical maximum scanning angle by the horizontal scanning device 3 is ±23.4 degrees, and optical performance of a beam diameter of 0.9 mm up to the ratio of 0.75 (±17.5 degrees) to the maximum scanning angle is shown. FIG. 11 proves that lateral aberration performance of this embodiment is excellent. In this range, the deflection angle θ of the reflective surface 3b of the horizontal scanning device 3 that resonates is:

$\theta = 2\Phi_{max} \cdot \sin(\omega t)$, and the reflective surface 3b is provided with characteristics for sinusoidal operation so that temporal movements of the scanning point have even intervals. With this structure, it becomes possible to reduce the burden on the modulation circuit 4a (see FIG. 1) that modulates the light source 4a.

Furthermore, as seen in the optical path diagram of FIG. 10, the reflective surface 3b of the horizontal scanning device 3 and the reflective surface 5b of the vertical scanning device 5 are made substantially conjugate to each other by the light guiding optical system 2. Therefore, the reflective surface 5b of the vertical scanning device 5 can be reduced in size.

In this embodiment, as in Embodiment 1, the light guiding optical system 2 is formed of an integrated transparent member having the incident surface 2a (second surface), the emergent surface 2g (eighth surface), and the reflective surfaces 2b through 2f (third through seventh surfaces) on its surface. With this structure, it becomes possible to integrally form the light guiding optical system 2, and this is advantageous for securing positional accuracies of the respective surfaces and reduces the size of the light guiding optical system 2.

Embodiment 3

Figure 12:
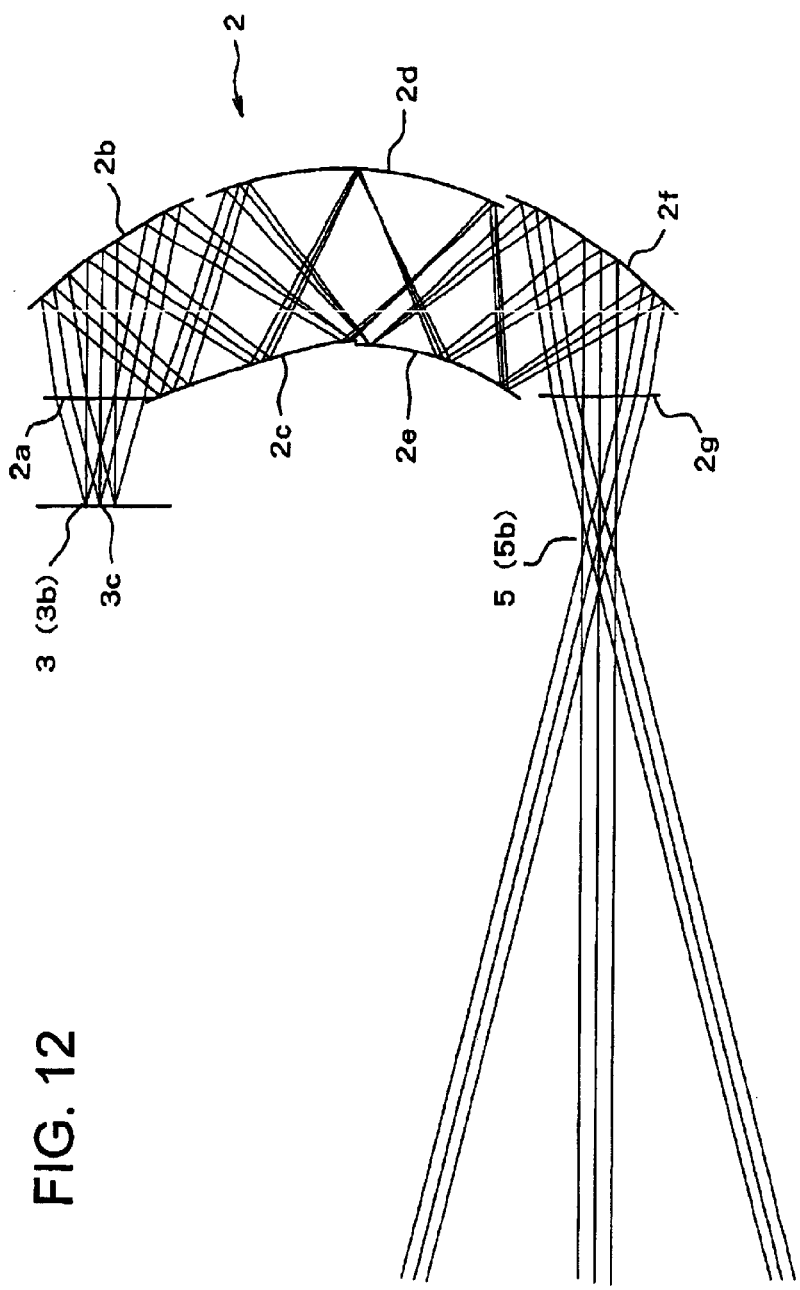
FIG. 12 is a block diagram of a scanning type image display apparatus of Embodiment 3 of the present invention.

FIG. 12 shows the structure of a scanning type image display apparatus having a scanning type display optical system of Embodiment 3 of the present invention. In this embodiment, components corresponding to the components in Embodiment 1 are attached with the same reference numerals of Embodiment 1, and description thereof is omitted.

FIG. 12 shows optical paths of light beams after being deflected by the horizontal scanning device 3, which have been emitted from the light source 4a (see FIG. 1) and collimated (or condensed) by the condenser optical system 4b (see FIG. 1). Herein, the optical paths of the light beams that are made incident on the vertical scanning device 5 and then advance toward the screen (see the reference numeral 9 in FIG. 2) are developed. In actuality, the optical paths are turned toward the direction perpendicular to the paper surface of FIG. 12 by the vertical scanning device 5.

In this embodiment, the horizontal scanning device 3 is a resonance scanning type device the deflection angle of which is 10.96 degrees, and has the same structure as that shown in FIG. 8.

Furthermore, when the maximum amplitude of the reflective surface 3b is defined as Φmax, the deflection angle becomes two times this maximum amplitude and is expressed as:

$$\theta = 2\Phi_{max} \cdot \sin(\omega t)$$

Herein, ω denotes the angular frequency of the horizontal scanning device 3, and t denotes time.

In this embodiment, θmax=10.96 degrees. As understood from the above expression, the scanning rate of such a resonance type scanning device becomes 0 in a condition of the maximum amplitude. Therefore, it is necessary to set the ratio of effective amplitude (effective amplitude θeff) to the maximum amplitude, and the ratio is 0.80 in this embodiment.

Namely, $$\theta_{eff} = 0.80\Phi, \text{ and}$$

an image is displayed at θ that is in a range of θ<θeff.

A numerical example of this embodiment is shown below. Herein, in Numerical example 3, the reflective surface 3b of the horizontal scanning device 3 in FIG. 12 is set as the first surface, and furthermore, the axis 3c of the reflective surface 3b shown in FIG. 10 attains the standards of the decentering amount data. Furthermore, Numerical example 3 shows a case where the entrance aperture (transmissive surface) 2a, the exit aperture (transmissive surface) 2g, and the reflective surfaces 2b through 2f are formed on the surface of an integrated transparent member. Correspondence between the optical surfaces in FIG. 12 and Numerical example 3 is as follows:

FIG. 12 Numerical Example 3
Transmissive surface 2a . . . Second surface
Reflective surface 2b . . . Third surface
Reflective surface 2c . . . Fourth surface
Reflective surface 2d . . . Fifth surface
Reflective surface 2e . . . Sixth surface
Reflective surface 2f . . . Seventh surface
Transmissive surface 2g . . . Eighth surface Furthermore, the reflective surface 5b of the vertical scanning device 5 shown in FIG. 12 is set as the ninth surface in Numerical example 3.

NUMERICAL EXAMPLE 3

Horizontal scanning angle: ±21.94 degrees (optical angle)
Effective scanning amplitude ratio: 0.80
Entrance pupil diameter: 1.00 mm Decentering amount data
(taking the first surface as the reference)

| i | $Y_i$ | $Z_i$ | $\theta_i$ | $D_i$ | $N_i$ | $v_i$ | |
|---|---|---|---|---|---|---|---|
| 1 | 0.00 | 0.00 | 0.00 | 3.00 | 1 | | horizontal scanning surface (aperture stop) |
| 2 | 0.00 | 3.00 | 0.00 | 4.00 | 1.49171 | 57.40 | transmissive surface |
| 3 | 0.00 | 7.00 | 30.00 | 6.00 | 1.49171 | 57.40 | reflective surface |
| 5 | −8.20 | 9.20 | 0.00 | 6.00 | 1.49171 | 57.40 | reflective surface |
| 6 | −11.20 | 4.00 | −15.00 | 6.00 | 1.49171 | 57.40 | reflective surface |
| 7 | −16.39 | 7.00 | −30.00 | 4.00 | 1.49171 | 57.40 | reflective surface |
| 8 | −16.39 | 3.00 | 0.00 | 4.00 | 1 | | transmissive surface |
| 9 | −16.39 | −21.00 | 0.00 | 400.00 | 1 | | vertical scanning surface (reflective surface) |
| img | −16.39 | −401.00 | 0.00 | | 1 | | image surface |

Surface form data
Second surface (rotationally symmetrical aspheric surface)
R2=−947.804
k=−37192431537671.102
A=0.00000e+000
B=7.27109e−004

Third surface (rotationally asymmetric surface)
C02=−1.97435e−002 C20=−2.24843e−002
C03=1.41278e−003 C21=3.09168e−003
C04=1.98092e−004 C22=6.46825e−004 C40=3.49975e−004

Fourth surface (rotationally asymmetric surface)
C02=−1.54992e−002 C20=3.02292e−002
C03=2.89487e−003 C21=7.79898e−003
C04=−2.56081e−004 C22=−1.12760e−003 C40=1.77792e−003

Fifth surface (rotationally asymmetric surface)
C02=−3.37181e−002 C20=−1.24998e−001

C03=1.22260e-003 C21=2.22353e-003
C04=-1.22843e-004 C22=-3.37579e-003 C40=-1.15491e-001

Sixth surface (rotationally asymmetric surface)
C02=-3.79012e-002 C20=-6.09323e-002
C03=3.37295e-003 C21=-9.83872e-004
C04=-9.03676e-004 C22=-3.74970e-003 C40=-1.55847e-002

Seventh surface (rotationally asymmetric surface)
C02=-2.33242e-002 C20=-2.46425e-002
C03=5.23461e-005 C21=6.61164e-004
C04=-3.07862e-004 C22=-9.99399e-004 C40=-1.02975e-003

Eighth surface (rotationally symmetrical aspheric surface)
R8=20.469
k=-44.000
A=-3.32756e-003
B=-1.18232e-005

Figure 13:
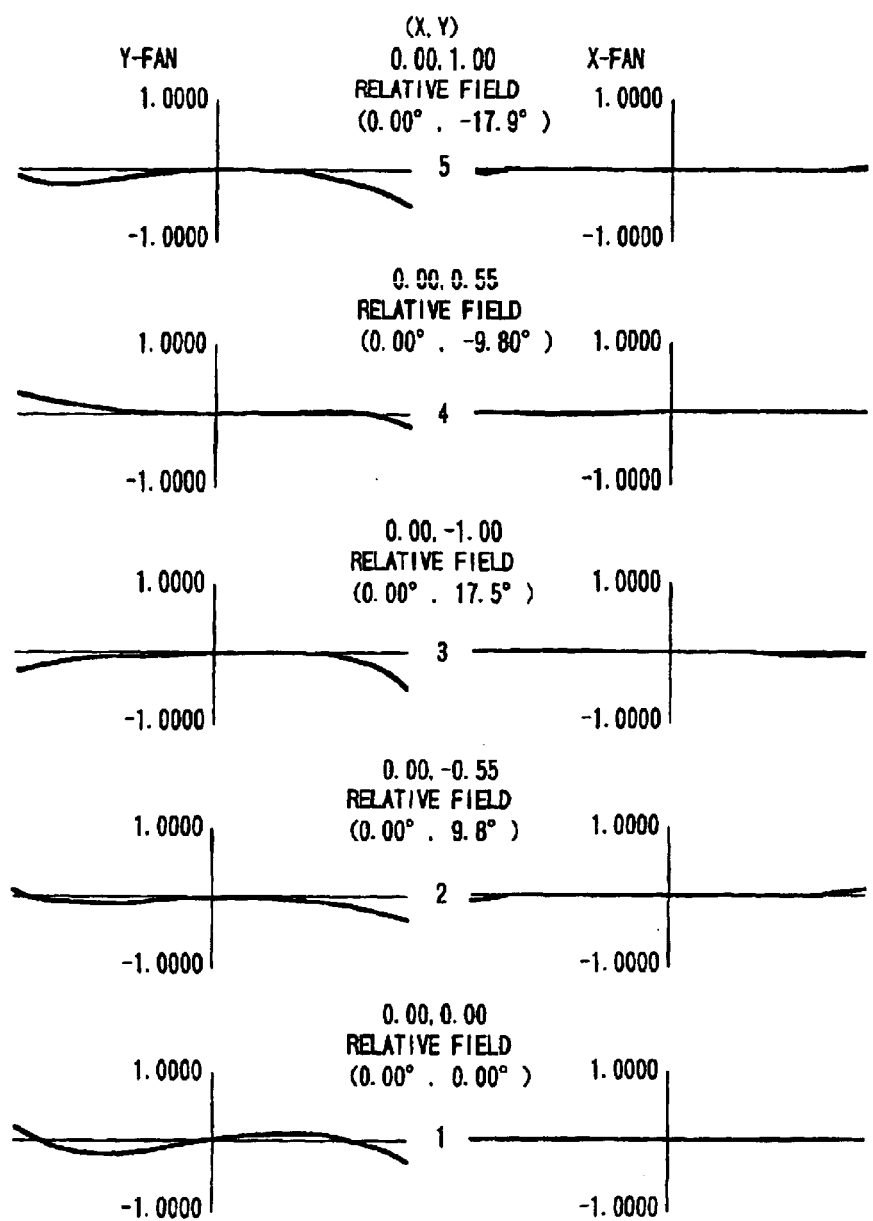
FIG. 13 is a lateral aberration diagram (in main scanning direction) of an optical system of the scanning type image display apparatus shown in FIG. 12.

FIG. 13 is a lateral aberration diagram in Numerical example 3. The wavelength of the light beam is set to 532 nm. However, this wavelength is for showing optical performance of this embodiment, and the wavelength of the light beam from the light source 4a does not necessarily have this wavelength. In this embodiment, the optical maximum scanning angle by the horizontal scanning device 3 is ±21.96 degrees, and optical performance of a beam diameter of 1.0 mm up to the ratio of 0.80 to the maximum scanning angle is shown. FIG. 13 proves that lateral aberration performance of this embodiment is excellent.

Furthermore, in this range, the deflection angle θ of the reflective surface 3b of the horizontal scanning device 3 that resonates is:

$$\theta = 2\Phi_{max} \cdot \sin(\omega t), \text{ and}$$

the reflective surface 3b is provided with characteristics for sinusoidal operation so that temporal movements of the scanning point have even intervals. With this structure, it becomes possible to reduce the burden on the modulation circuit 4a (see FIG. 1) that modulates the light source 4a.

Furthermore, as seen in the optical path diagram of FIG. 12, the reflective surface 3b of the horizontal scanning device 3 and the reflective surface 5b of the vertical scanning device 5 are made substantially conjugate to each other by the light guiding optical system 2. Therefore, the reflective surface 5b of the vertical scanning device 5 can be reduced in size.

In this embodiment, as in Embodiment 1, the light guiding optical system 2 is formed of an integrated transparent member having the incident surface 2a (second surface), the emergent surface 2g (eighth surface), and the reflective surfaces 2b through 2f (third through seventh surfaces) on its surface. With this structure, it becomes possible to integrally form the light guiding optical system 2, and this is advantageous for securing positional accuracies of the respective surfaces, and reduces the size of the light guiding optical system.

In the abovementioned Embodiments 1 through 3, a small-sized scanning type image display apparatus that carries out two-dimensional scanning by the horizontal scanning device 3 and the vertical scanning device 5 is described, and particularly, by structuring the scanning optical system 10 as mentioned in the Embodiments above, it becomes possible to compensate scanning of the resonance type scanning device.

Furthermore, Embodiments 1 through 3 describe the case where a light beam that has emerged from the horizontal scanning device 3 is further scanned by the vertical scanning device 5, however, use as a one-dimensional scanning optical system is possible by fixing the reflective surface of the vertical scanning device 5.

As described above, according to the respective Embodiments, a scanning type display optical system, a scanning type image display apparatus, and a scanning type image display system can be realized, which is small in size and achieves image display by two-dimensional scanning of light from a light source.

Concretely, by providing a light guiding optical system that includes a reflective surface for folding the optical path between the first scanning device and the second scanning device, the degree of freedom in arrangement of these scanning devices is increased, and a compact scanning type display optical system, moreover, a scanning type image display apparatus are realized.

Herein, the light guiding optical system is made to include a rotationally asymmetric reflective surface. As for a non-coaxial (off-axial) optical system having no axis of rotational symmetry, calculation of optical paraxial quantities and aberration correction have recently been actively researched, and are reported in Japanese Patent Application Laid-Open No. H9(1997)-5650 and "Analysis of Off-Axial Optical System (1), (2)" (OPTICAL REVIEW Vol. 7, No. 3, 4 (2000)), etc.

In the respective Embodiments, by providing the light guiding optical system with a rotationally asymmetric reflective surface that has no axis of rotational symmetry, it becomes possible to correct image distortion occurring due to light scanning by the scanning devices.

Furthermore, by making the optical surfaces of the first scanning device and the second scanning device substantially conjugate to each other by the light guiding optical system between the first and second scanning devices, it becomes possible to reduce the areas of the optical surfaces (reflective surfaces) of the first and second scanning devices, whereby the scanning type display optical system and the entirety of the image display apparatus can be reduced in size.

Furthermore, the light deflection angle of the first scanning device is changed sinusoidally with respect to time, high-speed operation becomes possible by using a mirror produced by semiconductor processes, etc. Particularly, when this mirror is operated by using mechanical resonance, it becomes possible to increase the light deflection angle in addition to high-speed operation. Thereby, the scanning type display optical system and the entirety of the image display apparatus can be reduced in size.

Moreover, in the optical system from the first scanning device to the second scanning device, by forming an image of light in the optical path in the light guiding optical system, distortion aberration which corrects light deflection characteristics of the first scanning device can be made, and thereby, mirror movements that sinusoidally change can be compensated.

While preferred embodiments have been described, it is to be understood that modification and variation of the present invention may be made without departing from the scope of the following claims.

What is claimed is:

1. A scanning type display optical system, comprising:
   a light source,
   a first scanning device which scans light from the light source in a first direction,
   a second scanning device which scans light from the first scanning device in a second direction that is different from the first direction, and a light guiding optical system which is provided between the first scanning device and the second scanning device and includes at least one rotationally asymmetric reflective surface to guide light from the first scanning device to the second scanning device.

2. The scanning type display optical system according to claim 1, further comprising:

an optical system which is disposed between the light source and the first scanning device, and condenses or collimates light from the light source to guide it to the first scanning device.

3. The scanning type display optical system according to claim 1, wherein the optical surface of the first scanning device and the optical surface of the second scanning device are made substantially conjugate to each other by the light guiding optical system.

4. The scanning type display optical system according to claim 1, wherein the light deflection angle by the first scanning device changes sinusoidally with respect to time.

5. The scanning type display optical system according to claim 1, wherein the first and second scanning devices are structured by using Micro Electro Mechanical System.

6. A scanning type image display apparatus, comprising:

a scanning type display optical system according to claim 1, a modulation circuit which is electrically connected to the light source and modulates the light source, and a drive circuit which is electrically connected to the first and second scanning devices and drives these scanning devices.

* * * * *

UNITED STATES PATENT AND TRADEMARK OFFICE
CERTIFICATE OF CORRECTION

PATENT NO. : 6,859,329 B2
DATED : February 22, 2005
INVENTOR(S) : Shuichi Kobayashi It is certified that error appears in the above-identified patent and that said Letters Patent is hereby corrected as shown below:

Title page,
Item [56], References Cited, U.S. PATENT DOCUMENTS, add:
-- 6,366,383 B1    4/2002    Roeder 359/202 --; and
FOREIGN PATENT DOCUMENTS, add:
-- CA 2,256,201    6/2000
JP 2000-180750    6/2000 --

Signed and Sealed this

Twenty-fourth Day of May, 2005

JON W. DUDAS
*Director of the United States Patent and Trademark Office*